(12) United States Patent
Mayer (10) Patent No.: US 10,113,586 B2
(45) Date of Patent: Oct. 30, 2018

(54) HYDRODYNAMIC AXIAL PLAIN BEARING

(71) Applicant: Ford Global Technologies, LLC, Dearborn, MI (US)

(72) Inventor: Kai-Martin Mayer, St. Augustin (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/294,440

(22) Filed: Oct. 14, 2016

(65) Prior Publication Data

US 2017/0108041 A1    Apr. 20, 2017

(30) Foreign Application Priority Data

Oct. 16, 2015  (DE) .................. 10 2015 220 213

(51) Int. Cl.
| | |
|---|---|
| *F16C 33/10* | (2006.01) |
| *F16C 9/04* | (2006.01) |
| *F16C 17/04* | (2006.01) |
| *F16C 7/02* | (2006.01) |
| *F16C 17/24* | (2006.01) |

(52) U.S. Cl.
CPC .......... *F16C 33/1075* (2013.01); *F16C 7/023* (2013.01); *F16C 9/04* (2013.01); *F16C 17/045* (2013.01); *F16C 17/047* (2013.01); *F16C 17/24* (2013.01); *F16C 33/107* (2013.01); *F16C 2233/00* (2013.01); *F16C 2240/30* (2013.01); *F16C 2240/46* (2013.01); *F16C 2360/22* (2013.01)

(58) Field of Classification Search
CPC ...... F16C 17/04; F16C 17/105; F16C 17/047; F16C 17/045; F16C 17/107; F16C 9/00; F16C 9/02; F16C 9/04; F16C 9/045; F16C 9/06; F16C 33/107; F16C 33/1075; F16C 7/023; F16C 2240/30; F16C 2240/46; F16C 2360/22; F16C 2233/00
See application file for complete search history.

(56) References Cited

U.S. PATENT DOCUMENTS

| | | | | |
|---|---|---|---|---|
| 3,713,714 A | * | 1/1973 | Hill | .......... F16C 17/10 384/294 |
| 4,175,801 A | * | 11/1979 | Coil | .......... F16C 9/02 384/429 |
| 4,213,659 A | | 7/1980 | Tielemans et al. | |
| 4,437,215 A | | 3/1984 | Nozue et al. | |
| 4,522,513 A | | 6/1985 | Nozue et al. | |
| 4,771,744 A | * | 9/1988 | Corbett | .......... F02B 75/22 123/196 W |

(Continued)

FOREIGN PATENT DOCUMENTS

| | | |
|---|---|---|
| DE | 102011101334 A1 | 11/2012 |
| DE | 102013021636 A1 | 6/2015 |
| JP | 57163723 A * | 10/1982 |

OTHER PUBLICATIONS

Machine Translation of JP 57-163723 dated Oct. 1982.*

*Primary Examiner* — Alan B Waits
(74) *Attorney, Agent, or Firm* — Julia Voutyras; McCoy Russell LLP (57) ABSTRACT

Methods and systems are provided for a thrust bearing. In one example, a system may include a thrust bearing located adjacent to a crankshaft and a connecting rod. The thrust bearing may comprise one or more angular surfaces configured to capture and direct lubricant to a crankshaft.

18 Claims, 10 Drawing Sheets

(56) References Cited

U.S. PATENT DOCUMENTS

| | | | | |
|---|---|---|---|---|
| 4,845,817 | A * | 7/1989 | Wilgus | B23P 15/003 29/898.054 |
| 5,192,136 | A * | 3/1993 | Thompson | F16C 9/02 384/123 |
| 5,520,466 | A * | 5/1996 | Everitt | F16C 17/10 384/124 |
| 5,829,338 | A | 11/1998 | Chrestoff et al. | |
| 6,132,094 | A * | 10/2000 | Cornelison | F16C 17/04 384/121 |
| 6,505,970 | B2 * | 1/2003 | Takahashi | F16C 17/04 384/107 |
| 7,240,584 | B1 * | 7/2007 | Luehrmann | F16J 1/16 384/192 |
| 7,354,199 | B2 * | 4/2008 | Welch | F16C 9/00 384/275 |
| 9,169,865 | B2 * | 10/2015 | Hayashi | F16C 17/047 |
| 2011/0011200 | A1 * | 1/2011 | Pohlman | F16C 9/04 74/579 R |
| 2014/0241887 | A1 * | 8/2014 | Neuenschwander | F01D 25/168 416/174 |

* cited by examiner

HYDRODYNAMIC AXIAL PLAIN BEARING

CROSS REFERENCE TO RELATED APPLICATION

The present application claims priority to German Patent Application No. 102015220213.5, filed on Oct. 16, 2015. The entire contents of the above-referenced application are hereby incorporated by reference in its entirety for all purposes.

FIELD

The present description relates generally to methods and systems for a hydrodynamic axial plain bearing.

BACKGROUND/SUMMARY

Crankshafts and connecting rods rotate at high-speeds during high engine loads, resulting in increased component temperatures along with increased axial and centrifugal forces being applied to the components. A hydrodynamic axial plain bearing may be used between the crankshaft and the connecting rod to provide lubrication to the components along with cooling. However, during certain thrust loads of the crankshaft, the hydrodynamic axial plain bearing may be insufficiently lubricate a gap between the hydrodynamic axial plain bearing and the crankshaft, resulting in metal-on-metal contact between the two, which may increase a likelihood of degradation.

Other attempts to address crankshaft lubrication include installing grooves and/or other grooves onto the hydrodynamic axial plain bearing. One example approach is shown by Chrestoff et al. in U.S. Pat. No. 5,829,338. Therein, a hydrodynamic axial plain bearing which has supporting surfaces configured such that a hydrodynamic lubricant film of a liquid lubricant can form in operation between the supporting surfaces and a bearing partner part. The supporting surfaces are here aligned parallel to corresponding supporting surfaces of the bearing partner part in a radial direction. Capture surfaces are mounted upstream thereof in the circumferential direction which are configured tilted to a normal on the supporting surface. This tilt lies in the circumferential direction. The purpose of these capture surfaces is to form a wedge-shaped gap to the bearing partner part in order to convey lubricant into a lubrication gap between the supporting surface and the bearing partner part on a relative movement of the hydrodynamic axial plain bearing relative to the bearing partner part.

However, the inventors herein have recognized potential issues with such systems. As one example, a lubricant path extends in a radial direction across an entire face of the hydrodynamic axial plain bearing. As a result, these paths are not constantly exposed to lubricant through a movement of the bearing and/or crankshaft. Thus, higher thrust loads may still result in metal-on-metal contact between the crankshaft and bearing.

The object of the present disclosure is to refine a hydrodynamic axial plain bearing such that a friction behavior and a wear behavior of the hydrodynamic axial plain bearing are improved further, also in relation to the bearing partner part. In a particular application, the axial friction contact between a connecting rod and a crankshaft is improved (e.g., decreased). Thus, the bearing may minimize wear and reduce friction between the bearing partner parts.

In one example, the issues described above may be addressed by a hydrodynamic axial plain bearing for supporting axial forces between bearing parts rotating relative to each other, comprising at least one supporting surface pointing in an axial direction towards one of the bearing parts, wherein viewed in a radial direction, the at least one supporting surface is arranged tilted to the radial direction, wherein the tilt is configured to form a lubrication gap, tapering radially towards the outside, between the supporting surface and the corresponding bearing part, wherein the supporting surface is part of an outer face of a connecting rod. In this way, friction between the connecting rod and the crankshaft is decreased due to the consistent lubrication provided by the bearing through a range of thrust loads of the crankshaft.

As one example, axial bearings are located on opposite sides of a bottom of a connecting rod where the connecting rod is coupled to a crankshaft. The axial bearings are ring-shaped with wedges and/or bevels configured to supply lubricant to a gap between the bearings and the crankshaft. The bevels face are located on surfaces of the bearings interfaced with the crankshaft along an entire circumference of the bearings. In one example, the bevels are differently angled to provide further lubrication while also mitigating a movement of the crankshaft due to varying thrust loads. Thus, an easy-to-design bearing may be installed on a plurality of connecting rods to decrease a likelihood of degradation to the connecting rod and/or the crankshaft.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
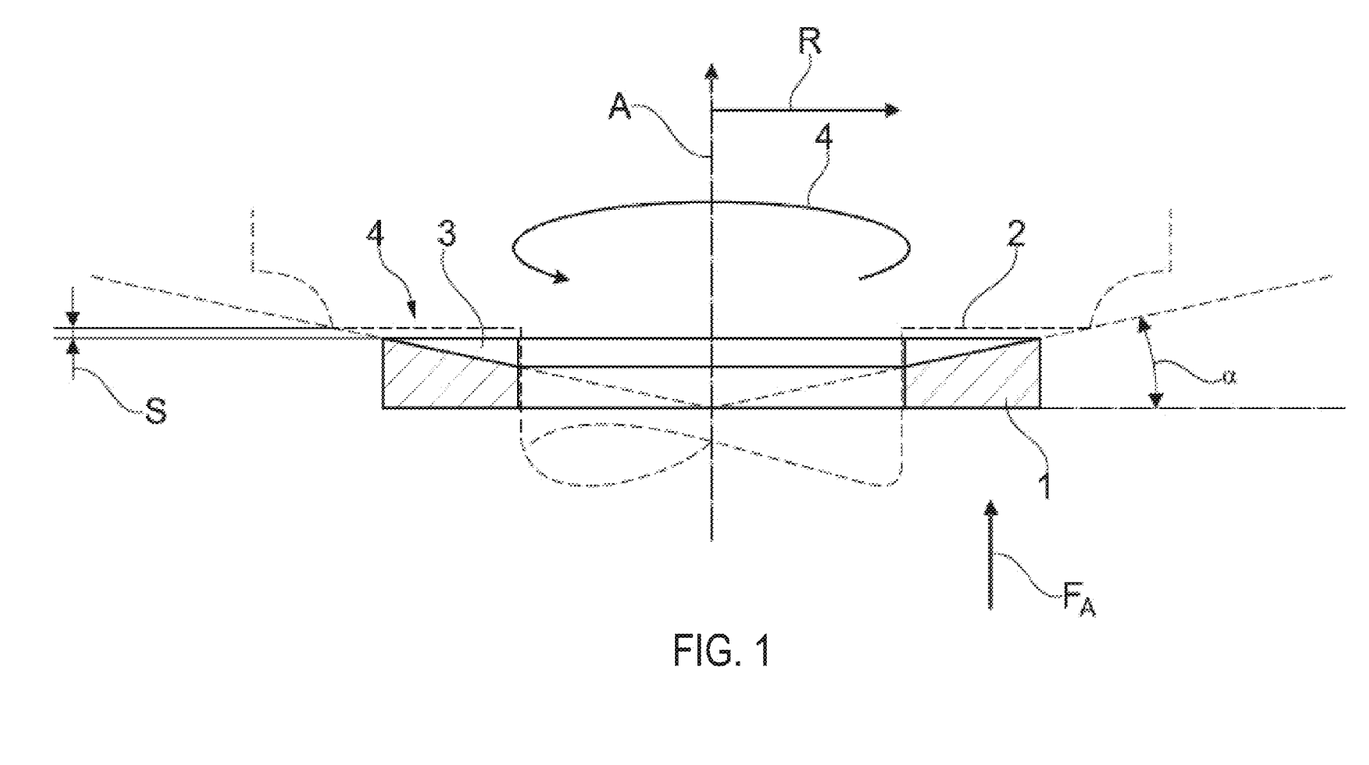
FIG. 1 shows a cross section through a first embodiment of a hydrodynamic axial plain bearing according to the present disclosure, with disproportionately enlarged tilt of a supporting surface.
Figure 2:
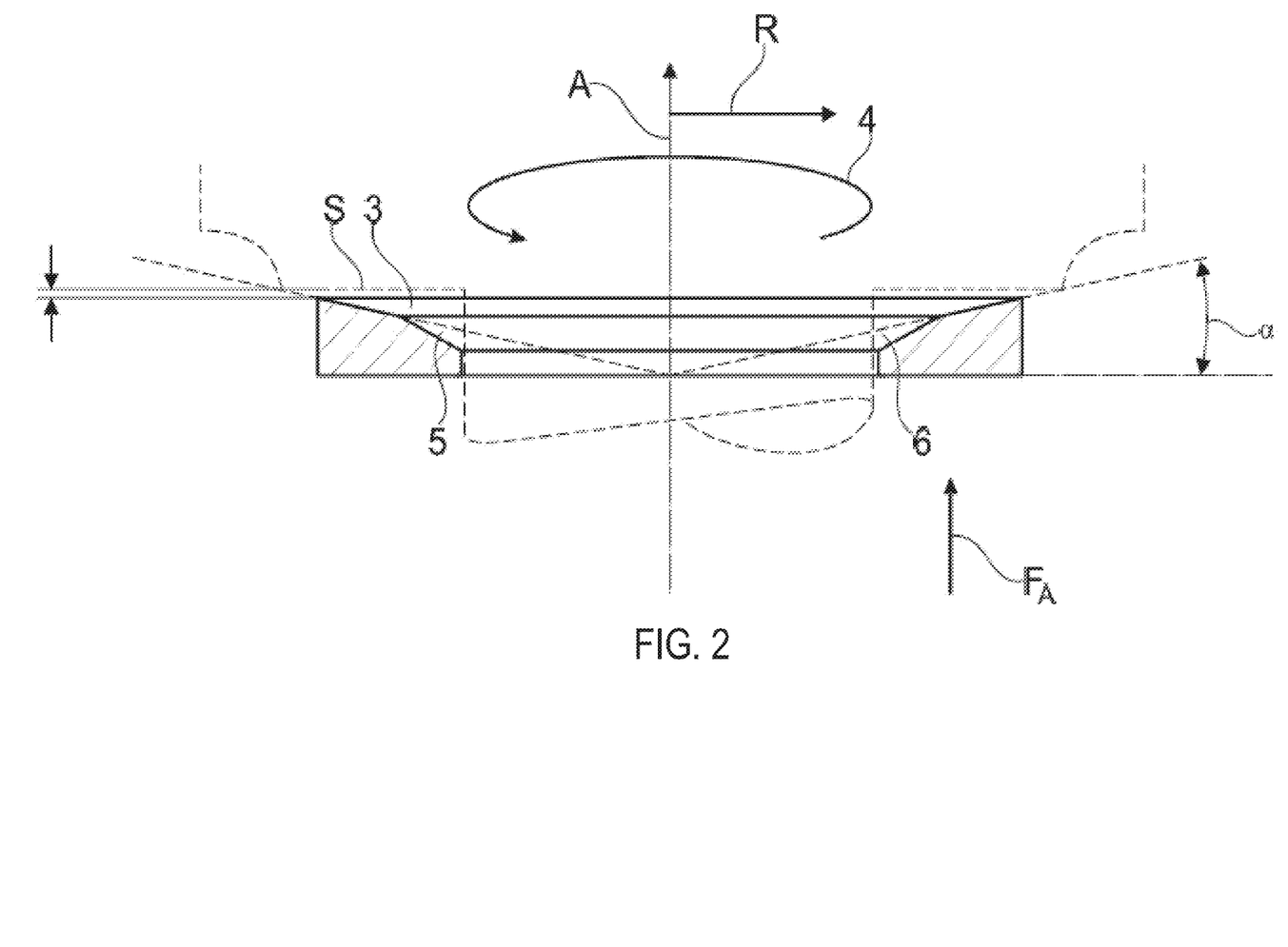
FIG. 2 shows a cross section through a second embodiment of a hydrodynamic axial plain bearing according to the present disclosure with another disproportionately enlarged tilt of the supporting surface.
Figure 3:
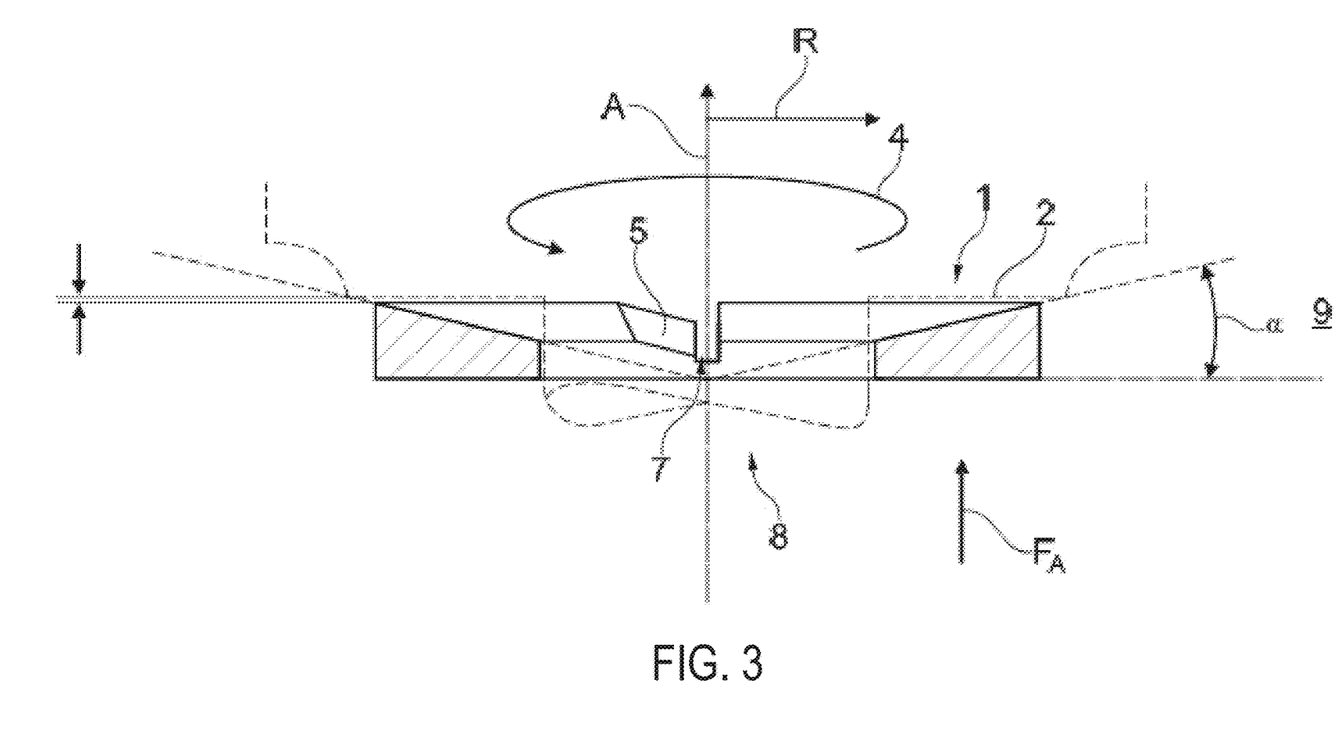
FIG. 3 shows a cross section through a third embodiment of a hydrodynamic axial plain bearing according to the present disclosure with a disproportionately enlarged tilt of the supporting surface.
Figure 4:
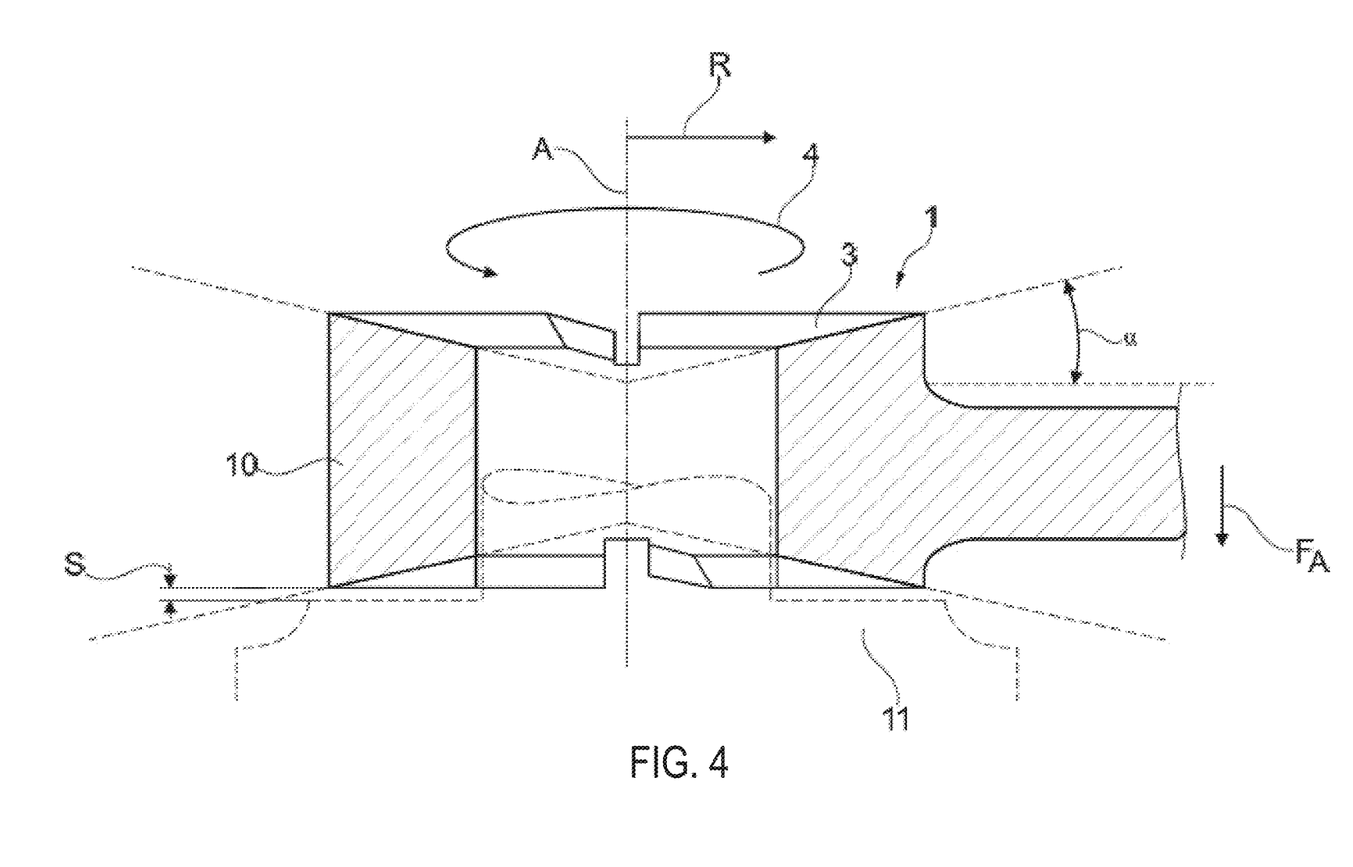
FIG. 4 shows an application of the axial plain bearing according to FIG. 3 between a connecting rod and a crankshaft.
Figure 5:
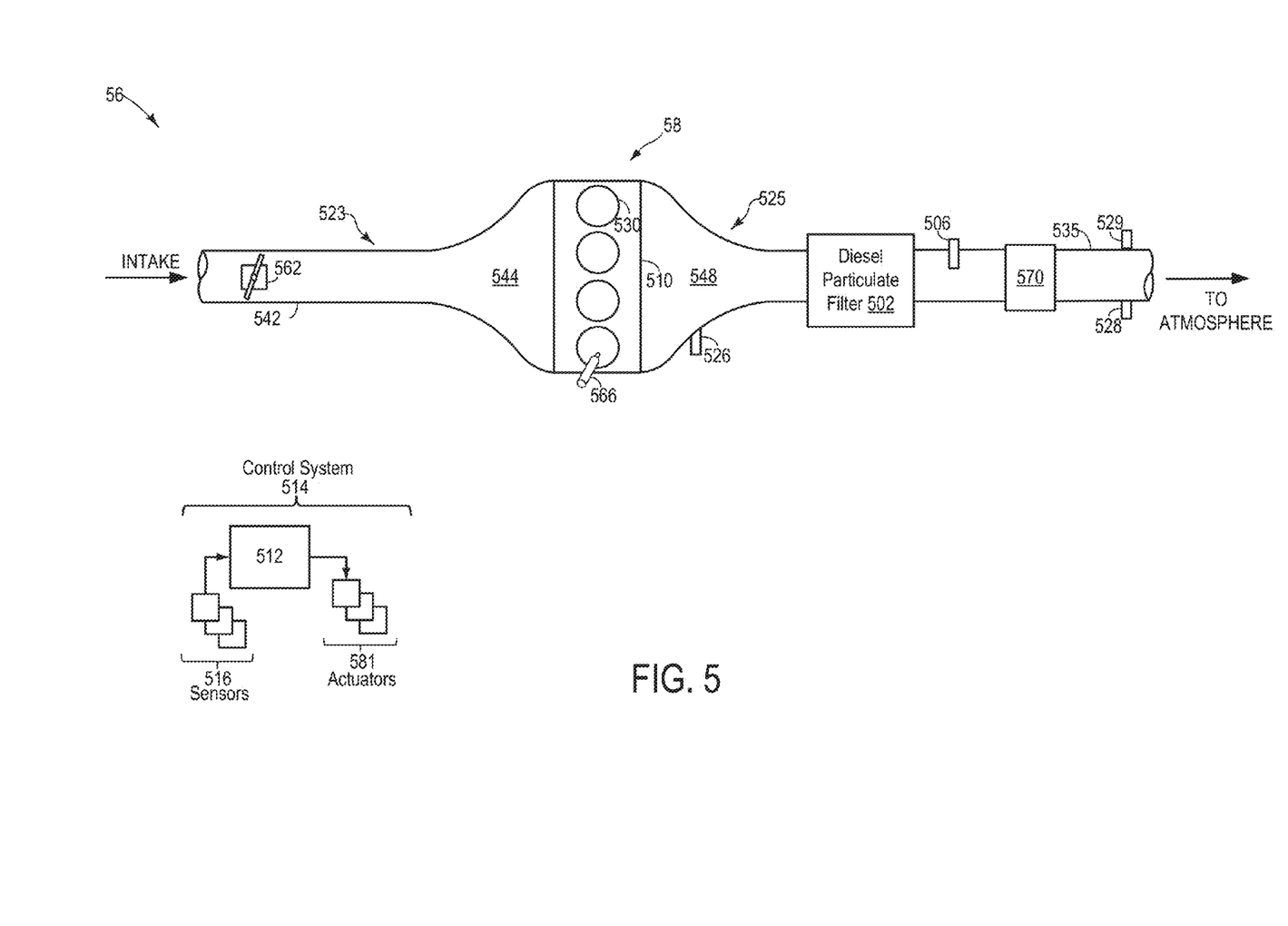
FIG. 5 shows a schematic diagram of an engine.
Figure 6:
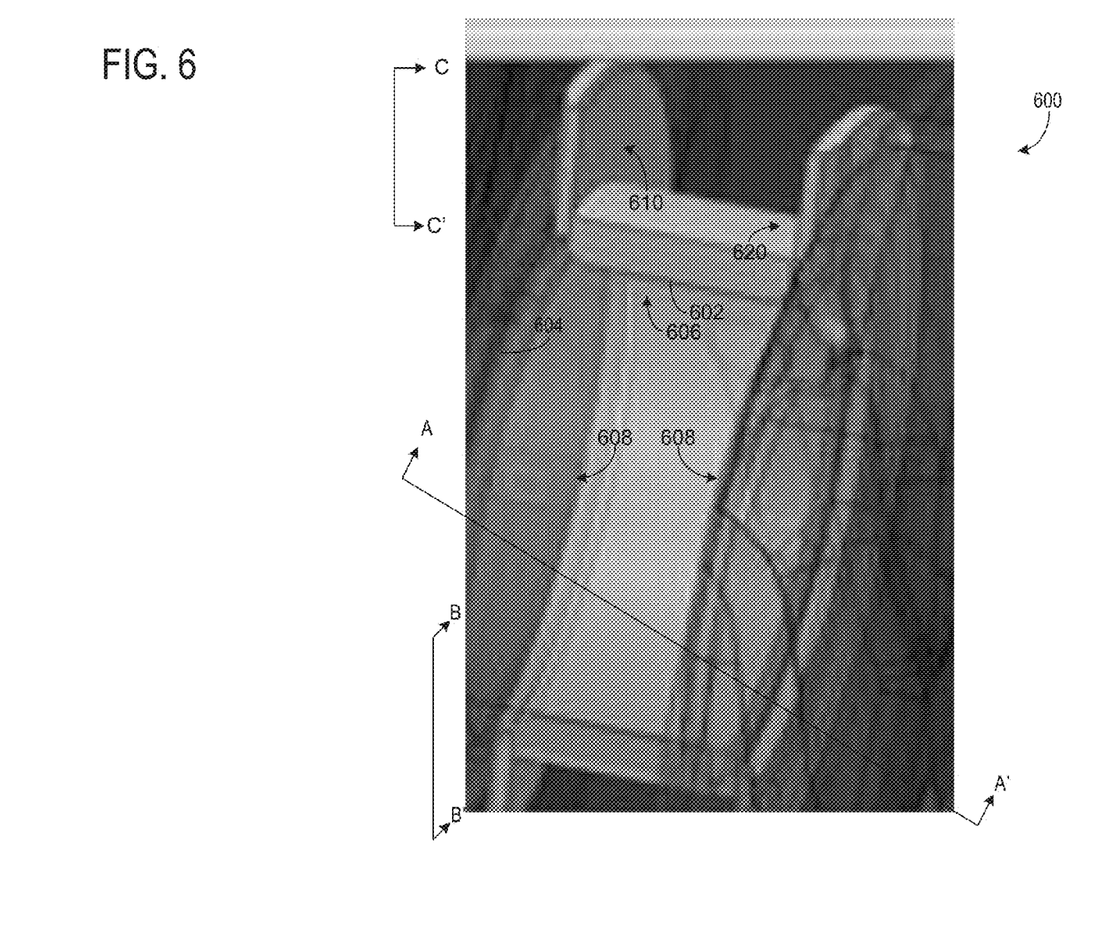
FIG. 6 shows an isometric view of the axial plain bearing.
Figure 7:
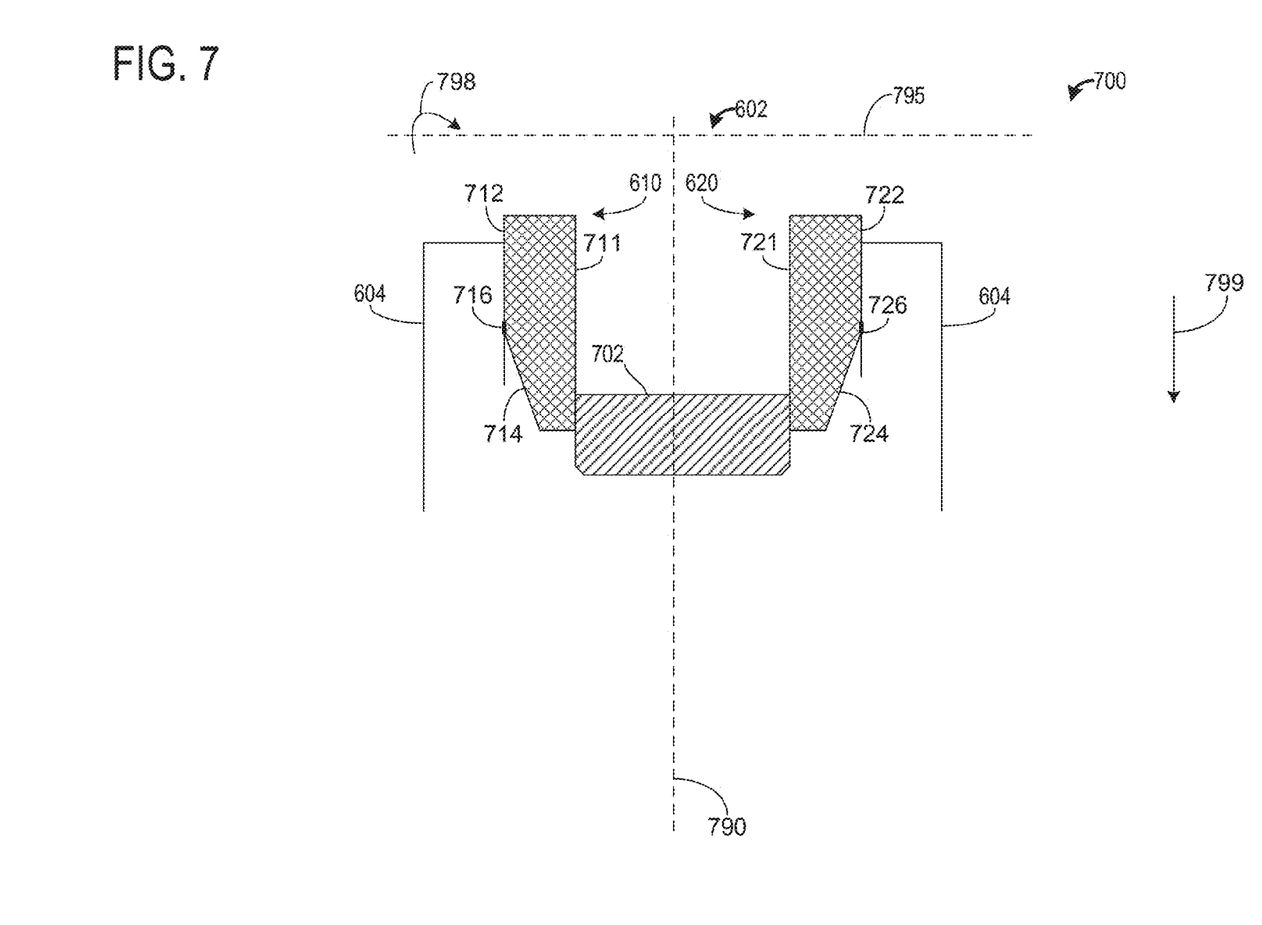
FIG. 7 shows a two dimensional view of the axial plain bearing coupled to the crankshaft.
Figure 8:
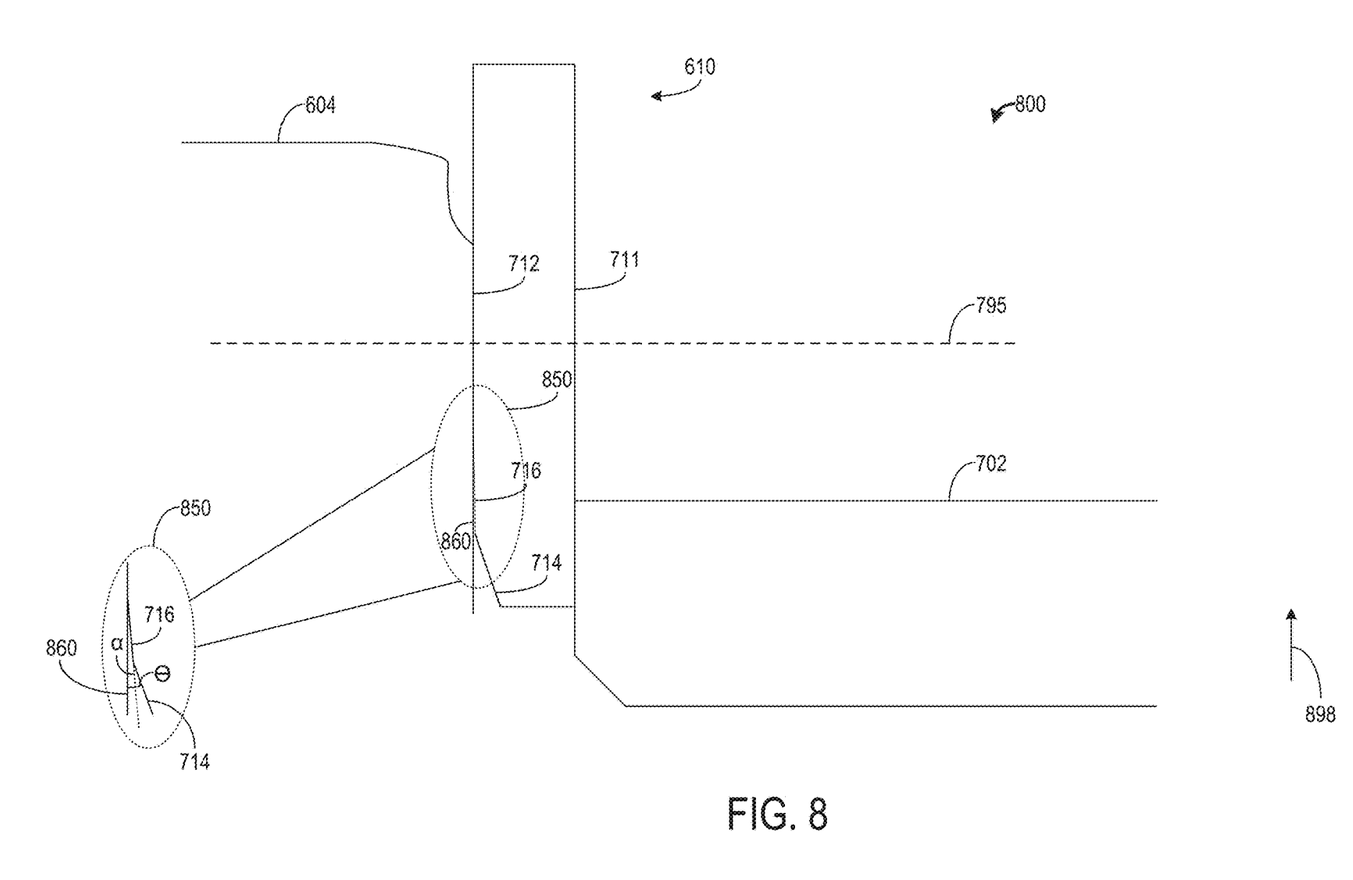
FIG. 8 shows a detailed view of a gap between the crankshaft and the axial plain bearing.
Figure 9A:
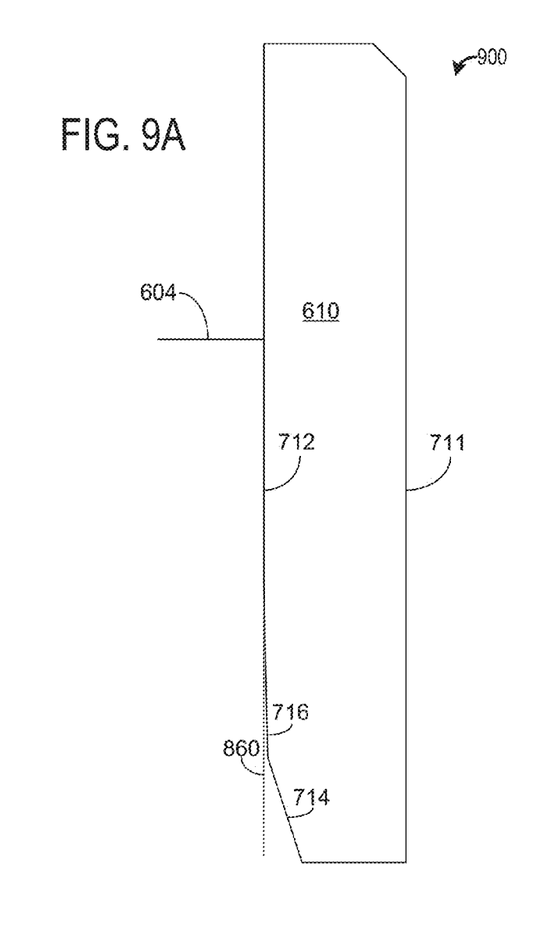
FIGS. 9A and 9B show cross-sectional views of the axial plain bearing according to cutting planes in FIG. 6.
Figure 9B:
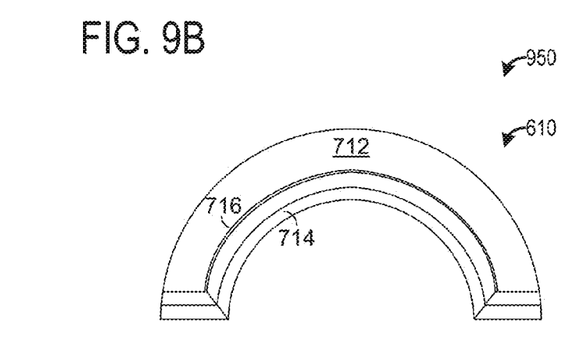
Figure 10:
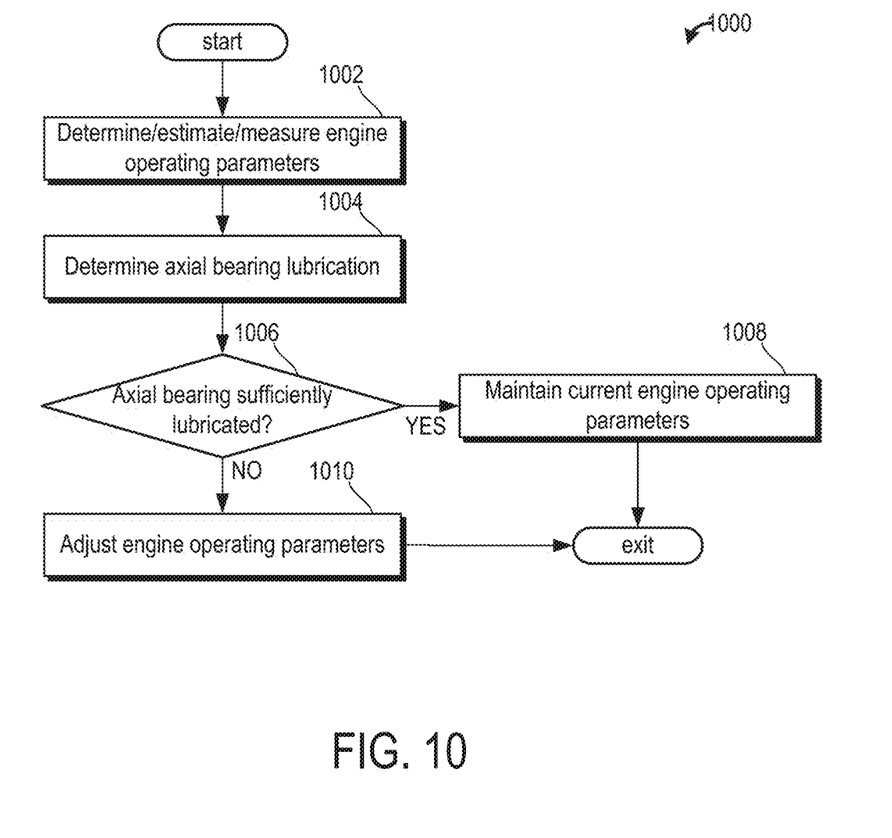
FIG. 10 shows a method for altering engine operating conditions in response to a lubrication of the hydrodynamic bearing.

The following description relates to systems and methods for a hydraulic axial plain bearing. The hydraulic axial plain bearing may be located between the crankshaft and the connecting rod as shown in FIG. 4. Various embodiments of the hydraulic axial plain bearing are shown in FIGS. 1-3. An engine schematic including a plurality of cylinders is shown in FIG. 5. The cylinders are defined by a piston, which may reciprocate based on movement of a crankshaft and a connecting rod. The hydraulic axial plain bearing is shown in FIG. 6, where bearings are located between the connecting rod and the crankshaft. The bearings include bevels for forcing lubrication into a gap between the crankshaft and the bearing, as shown in FIG. 7. A detailed view of angles of the bevels along with the gap between the bearing and the crankshaft is shown in FIG. 8. Side-on and face-on views of the hydraulic axial plain bearing are shown in FIGS. 9A-9B according to cutting planes in FIG. 6. A method for determining sufficient lubrication between the crankshaft and the hydraulic axial plain bearing is shown in FIG. 10.

FIGS. 1-9B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 1, a hydrodynamic axial plain bearing 1 according to the present disclosure serves to support axial forces FA between bearing parts rotating relative to each other. One of the bearing parts is depicted in the figures in dotted lines as a shaft stump carrying reference numeral 2. A second bearing part rotating relative to the first bearing part 2 may for example be the axial plain bearing 1 itself or a part fixedly connected thereto.

The axial plain bearing 1 has a supporting surface 3 pointing towards the bearing part 2, which serves to form a lubrication gap S between the bearing part 2, referred to below as the bearing partner part 2 and the supporting surface 3.

In the axial plain bearing 1 according to the present disclosure, viewed in the radial direction R, the supporting surface 3 is tilted to the radial direction R, wherein the tilt is configured to form the lubrication gap S tapering radially towards the outside for a portion of the axial plain bearing 1. The lubrication gap S is arranged between the supporting surface 3 and the corresponding bearing part, i.e. the bearing partner part 2. As well as a tilt of a surface which is flat in cross section according to FIG. 1, a radially outwardly tapering lubrication gap S may also be created by a contouring of the supporting surface 3. For example, the supporting surface 3 may be curved in cross section, wherein the curvature is arranged such that at least in part regions, there is a radially outward tapering of the lubrication gap S. It has been observed that at the narrowest point 4 of the lubrication gap S, due to the tilt/contouring of the supporting surface 3, a hydrodynamic lubricant film results which has a particularly high stress- and load-bearing capacity, which achieves that the axial plain bearing 1 and the bearing partner part 2 have a reduced wear. It has also been observed that a lubrication gap is built up even at low speeds of the bearing parts relative to each other, in comparison with supporting surfaces 3 which run parallel to the bearing partner part 2 in the radial direction R.

The inward tilt of the supporting surface 3 in the radial direction R has an angle $\alpha$ which suitably is less than 5°, in particular less than 1°. The angle $\alpha$ here is measured relative to the radial direction R.

Turning now to FIG. 2, a further embodiment of the axial plain bearing 1 is shown with a radially tilted capture surface 5 arranged radially inside the supporting surface 3. The capture surface 5 is arranged for example tilted more greatly in the radial direction relative to the supporting surface 3 or is stepped, in any case configured such that a lubricant capture gap 6 is formed which is larger than the tapering lubrication gap S. This lubricant capture gap 6, which in the present example is wedge-shaped, can collect lubricant which is available to form the actual load-bearing hydrodynamic lubricant film which is created in operation in lubrication gap S. Said another way, the radially tilted capture surface 5 is bevel shaped and radially interior to the supporting surface 3 along the axial plain bearing 1. As such, the axial plain bearing 1 is ring-shaped with the radially tilter capture surface 5 and the supporting surfaces spanning an entire circumference of the axial plain bearing 1.

Turning now to FIG. 3, alternatively or additionally to the capture surfaces 5, the axial bearing 1 may have lubricant grooves 7 distributed over the circumference and open towards the corresponding bearing partner part 2. Such lubricant grooves 7, which fluidly couple a radially inner region of a bearing bore 8 of the axial bearing 1 and a radially outer region 9 of the axial bearing 1 may be evenly spaced apart along a circumference of the axial bearing 1. Unlike the capture surface 5 and supporting surfaces 3, the lubricant grooves 7 do not traverse an entire circumference of the axial plain bearing 1. Viewed in a circumferential direction, starting from the lubricant groove 7, lubricant capture surfaces 5 may be provided which force an enlargement of the lubrication gap S in the circumferential direction. It will be appreciated that the circumferential direction, which is shown in a U-shape, may be other shapes without departing from the scope of the present disclosure, for example, V-shaped, C-shaped, and other suitable shapes.

According to the present disclosure, a hydrodynamic axial plain bearing for supporting axial forces FA between bearing parts rotating relative to each other, having at least one supporting surface pointing in an axial direction towards one of the bearing parts, is refined in that viewed in a radial direction R, the at least one supporting surface is arranged tilted to the radial direction R and/or is contoured, wherein the tilt and/or contouring is configured to form a lubrication gap S, tapering radially towards the outside, between the supporting surface and the corresponding bearing part, i.e. a bearing partner part, wherein the supporting surface is a part of an outer face of a connecting rod which cooperates in particular with a bearing partner face of a bearing partner part, e.g. a crankshaft. In some examples, additionally or alternatively, the supporting surface is a part of the hydrodynamic axial plain bearing.

With such a tilt/contouring of the supporting surfaces in the radial direction, the support surface may capture liquid lubricant which is flung radially outward from a bearing bore of the axial bearing under centrifugal force, through a radially inwardly enlarged lubrication gap S, and transport it into the lubrication gap S tapering radially towards the outside. For this application, the hydrodynamic axial plain bearing according to the present disclosure has proved particularly favorable in an axial friction contact between a connecting rod and a crankshaft.

In this way, a more reliable build-up is achieved together with an oil film with increased load-bearing capacity between the surfaces moving towards each other, i.e. the supporting surface and a corresponding supporting surface of the bearing partner part. It has been observed that, in this way, the friction and wear in the axial bearing according to the present disclosure and in a bearing partner part are reduced. In particular, on a slight movement of the bearing partner parts relative to each other, the lubricant film is built up more quickly and at a lower speed of the bearing partner parts relative to each other.

In a particular embodiment of the present disclosure, the supporting surface, in addition to the radial direction, is also tilted and/or contoured in a circumferential direction, wherein the tilt/contouring in the circumferential direction is configured to form a lubrication gap S, tapering in the circumferential direction, between the supporting surface and a corresponding bearing part.

Furthermore, it is proposed that at least one capture surface is arranged adjacent to the supporting surface in the circumferential direction and/or lying further inward in the radial direction R, for forming a lubricant capture gap. Such a capture surface may here be arranged such that it forms an enlarged gap opposite the bearing partner part in the manner of a catchment pocket, in which lubricant collects during operation and is available for forming the lubrication gap s which e.g. lies radially further out. A catchment surface suitably forms a significantly larger lubrication gap S opposite the bearing partner part than the supporting surface.

In a further embodiment, a tilt angle α of the supporting surface in the radial direction R is less than 5°. In one example, the tilt angle α less than 1°. An angle of the capture surface 5 may be greater than the angle α, as will be described below.

An associated lubrication gap S which, according to the present disclosure, runs tapering outwardly in the radial direction R along an entire circumference of the bearing 1, i.e. in the manner of a wedge, radially further inward is suitably less than 50 μm larger than at its narrowest point. In some embodiments, the lubricant gap S may be radially further inward 20 μm to 40 μm larger than at its narrowest point.

In addition to the above-mentioned measures, it may be suitable for the hydrodynamic axial bearing according to the present disclosure to have lubricant grooves open towards the corresponding bearing partner part. These lubricant grooves serve firstly to provide sufficient lubricant to form a load-bearing, hydrodynamic lubrication gap S. Secondly, the lubricant grooves connect fluidically a radially inner region of a bearing bore of the axial bearing to a radially outer region of the axial bearing, so that excess lubricant which for example is not required to form the load-bearing lubricant film may escape from the bearing point with minimum obstruction.

Turning now to FIG. 4, the hydrodynamic axial plain bearing 1 is integrated in a connecting rod 10, e.g. of an internal combustion engine, wherein the supporting surface 3 is part of an outer face of a connecting rod 10, in particular of a connecting rod eye. In such a case, the hydrodynamic axial plain bearing 1 according to the present disclosure is particularly preferably used between the connecting rod 10 and a crankshaft 11.

FIG. 5 shows a schematic depiction of a vehicle system 56. The vehicle system 56 includes an engine system 58. The engine system 58 may include an engine 510 having a plurality of cylinders 530. Engine 510 includes an engine intake 523 and an engine exhaust 525. Engine intake 523 includes a throttle 562 fluidly coupled to the engine intake manifold 544 via an intake passage 542. The engine exhaust 525 includes an exhaust manifold 548 eventually leading to an exhaust passage 535 that routes exhaust gas to the atmosphere. Throttle 562 may be located in intake passage 542 downstream of a boosting device, such as a turbocharger (not shown), and upstream of an after-cooler (not shown). When included, the after-cooler may be configured to reduce the temperature of intake air compressed by the boosting device.

Engine exhaust 525 may include one or more emission control devices 570, which may be mounted in a close-coupled position in the exhaust. One or more emission control devices may include a three-way catalyst, lean NOx filter, SCR catalyst, etc. Engine exhaust 525 may also include diesel particulate filter (DPF) 502, which temporarily filters PMs from entering gases, positioned upstream of emission control device 570. In one example, as depicted, DPF 502 is a diesel particulate matter retaining system. DPF 502 may have a monolith structure made of, for example, cordierite, or silicon carbide, with a plurality of channels inside for filtering particulate matter from diesel exhaust gas. Tailpipe exhaust gas that has been filtered of PM, following passage through DPF 502, may be measured in a PM sensor 506 and further processed in emission control device 570 and expelled to the atmosphere via exhaust passage 535. In the depicted example, PM sensor 506 is a resistive sensor that estimates the filtering efficiency of the DPF 502 based on a change in conductivity measured across the electrodes of the PM sensor.

The vehicle system 56 may further include control system 514. Control system 514 is shown receiving information from a plurality of sensors 516 (various examples of which are described herein) and sending control signals to a plurality of actuators 581 (various examples of which are described herein). As one example, sensors 516 may include exhaust flow rate sensor 526 configured to measure a flow rate of exhaust gas through the exhaust passage 535, exhaust gas sensor (located in exhaust manifold 548), temperature sensor 528, pressure sensor 529 (located downstream of emission control device 570), and PM sensor 506. Other sensors such as additional pressure, temperature, air/fuel ratio, exhaust flow rate and composition sensors may be coupled to various locations in the vehicle system 56. As another example, the actuators may include fuel injectors 566, throttle 562, DPF valves that control filter regeneration (not shown), switch of electric circuit, etc. The control system 514 may include a controller 512. The controller 512 may be configured with computer readable instructions stored on non-transitory memory. The controller 512 receives signals from the various sensors of FIG. 5, processes the signals, and employs the various actuators of FIG. 5 to adjust engine operation based on the received signals and instructions stored on a memory of the controller.

The figures below show an embodiment of a thrust bearing (e.g., hydraulic plain bearing 1) configured with both the supporting surface and the capturing surface. The thrust bearing further comprises a surface for physically coupling to a connecting rod (e.g., connecting rod 10 of FIG. 4). As such, the thrust bearing is in sealing contact and pressed against the connecting rod, and is located between the connecting rod and the crankshaft, as described below. In this way, the thrust bearing follows a movement of the connecting rod and provides lubrication to a gap between contours of the thrust bearing and the crankshaft.

In one example, a system, comprising a connecting rod and a crankshaft and a thrust bearing located between the connecting rod and the crankshaft, the thrust bearing further comprising a larger bevel and a smaller bevel traversing an entire circumference of the thrust bearing; wherein the larger bevel is angled less acutely than the smaller bevel. The smaller bevel extends in a radial direction less than the larger bevel such that a gap between the crankshaft and the smaller bevel is smaller than a gap between the crankshaft and the larger bevel. Specifically, the larger bevel comprises an angle 20 times greater than an angle of the smaller bevel. A cross-section of the larger and smaller bevels is parallel to a direction of rotation of the connecting rod and the crankshaft. Said another way, the thrust bearing is a ring-shape with a plane of the ring being parallel to the direction of rotation of the connecting rod and the crankshaft.

Additionally or alternatively, an example of a system comprise a connecting rod comprising a thrust bearing at an interface between the connecting rod and a crankshaft, and where the thrust bearing is ring-shaped with a larger bevel located radially interior to a smaller bevel, and where the larger and smaller bevels extend around an entire inner circumference of the thrust bearing. The larger bevel is angled less acutely than the smaller bevel, and where the angle of the larger bevel is equal to 20° and the angle of the smaller bevel is equal to 1°. The angle of the larger bevel is gradually reduced in an outwardly radial direction toward the smaller bevel. The larger bevel and smaller bevel form gaps between the thrust bearing and the crankshaft, and where the gap between the larger bevel and the crankshaft is larger than the gap between the smaller bevel and the crankshaft. Lubrication grooves extending in a radially outward direction along the larger and bevels. The thrust bearing is physically coupled to a bottom of the connecting rod.

Turning now to FIG. 6, it shows a 3-D view 600 of a bottom 602 of a connecting rod 606 (e.g., connecting rod 10 of FIG. 4) coupled to a crankshaft 604 (e.g., crankshaft 11 of FIG. 4). Thrust bearings 610 and 620 are located on opposite sides of the bottom 602 of the connecting rod 606. As shown, the thrust bearings 610 and 620 are circular and surround bores 608 of the bottom 602. The crankshaft 604 comprises rod-like portions passing through the bores 608. The thrust bearings 610 and 620 are located between the connecting rod 606 and the crankshaft 604. The thrust bearings 610 and 620 are physically coupled to the bottom 602 of the connecting rod 606 via welds, adhesives, screws, fusions, and/or other suitable coupling elements. The bearings 610 and 620 follow a movement of the connecting rod 606 as crankshaft 604 actuates to oscillate a piston of an engine. Geometric features of the thrust bearings 610 and 620 are described below.

Turning now to FIG. 7, it shows a cross-sectional view 700 taken along cutting plane A-A' of FIG. 6. Thus, components previously introduced may be similarly numbered in subsequent figures. As shown, the crankshaft 604 completely surrounds the bottom 602 of the connecting rod (e.g., connecting rod 606 of FIG. 6). A majority of the crankshaft 604 extends in a horizontal direction along the horizontal axis 795, perpendicular to the vertical axis 690. The thrust bearings 610 and 620 are identical rings oppositely oriented about vertical axis 790. A bearing 702 is located between the thrust bearings 610 and 620 at the bottom 602. The bearing 702 may be physically coupled to both the thrust bearings 610 and 620 and the connecting rod. Thus, all three bearings may follow a movement of the connecting rod while also providing lubrication to spaces between the bearings and the crankshaft. In one example, geometries of the bearing 702 may be less intricate than the thrust bearings 610 and 620, since lubricating between bearing 702 and the crankshaft 604 may be assisted by gravity (direction of gravity is shown by arrow 799). The crankshaft 604 and connecting rod rotate about the horizontal axis 795 in a direction similar to the arrow 798. Thus, the motion of the crankshaft 604 and connecting rod may be circular or elliptical. Other shaped motions may be realized without departing from the scope of the present disclosure. As such, the thrust bearings 610 and 620 are parallel to the direction of motion of the crankshaft 604 and connecting rod 606.

Thrust bearings 610 and 620 comprise crankshaft sides 712 and 722 adjacent the crankshaft 604, respectively. Thus, sides 711 and 721 correspond to a connecting rod side of the thrust bearings 610 and 620, respectively. While the bearings 610 and 620 are physically coupled to the connecting rod at the connecting rod sides 711 and 721, the bearings are spaced away from the crankshaft 604 at the crankshaft sides 712 and 722. However, the crankshaft sides 712 and 722 may touch the crankshaft 604 during engine-off conditions as lubricate is no longer delivered to a gap between the crankshaft sides 712 and 722 and the crankshaft 604.

Larger bevels 714 and 724 are located along the crankshaft sides 712 and 722, respectively, and are configured to provide lubrication (e.g., oil) from a crankcase or oil journal, in one example. The larger bevels 714 and 724 may be substantially equal to the capture surface 5 described above. The larger bevels 714 and 724 generate a space between the thrust bearing 610 and 620 and the crankshaft 604, respectively. During motion of the crankshaft 604, centrifugal forces (perpendicular to a direction of motion 798) may push lubricant (e.g., oil) into the gap generated by the larger bevels 714 and 724. However, larger bevels 714 and 724 may not provide sufficient lubrication to portions of the thrust bearings 610 and 620 adjacent the crankshaft 604 above thick lines 716 and 726. For example, during conditions where a crankshaft 604 thrust load exceeds a threshold load, larger bevel 714 and/or larger bevel 724 do not provide sufficient lubrication to prevent metal-on-metal contact between the thrust bearings 610 and/or 620, respectively, and the crankshaft 604. As such, smaller bevels (indicated by thick lines 716 and 726), e.g., supporting surfaces 3 described above, are cutout into the thrust bearings to provide sufficient lubrication even when the thrust load of the crankshaft 604 exceeds the threshold load. Herein, thick lines 716 and 726 are also referred to as smaller bevels 716 and 726, respectively. In this way, smaller bevels 716 and 726 provide lubrication to portions of the thrust bearings 610 and 620 above the smaller bevels to prevent metal-on-metal contact that the larger bevels 714 and 724 cannot.

In one example, using only larger bevels 714 and 724 may not provide sufficient lubrication while also preventing significant movement (e.g., sliding) of the crankshaft along the horizontal axis 795. Thus, the smaller bevels 716 and 726 provide further lubrication between the thrust bearing 610 and 620 while also mitigating a horizontal movement of the crankshaft 604 due to changing thrust loads.

Turning now to FIG. 8, it shows a detailed view 800 of an interface 850 between the crankshaft 604 and the thrust bearing 610. Thrust bearing 620 is omitted from FIG. 8, however, the description below regarding the size and shape of the larger bevel 714 and smaller bevel 716 may be applied to larger bevel 724 and smaller bevel 726 of the thrust bearing 620. Thus, the thrust bearing 620 is substantially identical to the thrust bearing 610 and may be a mirror image of the thrust bearing 610.

Detailed view 800 depicts the thrust bearing 610 with the larger bevel 714 and the smaller bevel 716 creating two different acute angles relative to the surface 860 of the crankshaft 604 adjacent the thrust bearing 610. As shown, the angle $\theta_1$ corresponds to the larger bevel 714 and is larger than angle $\alpha$, which corresponds to the smaller bevel 716. Specifically, the angle $\theta_1$ is 20 times larger than the angle $\alpha$. For example, the angle $\theta_1$ is 20° and the angle $\alpha$ is 1°. In this way, a distance between the smaller bevel 716 and the surface 860 is less than a distance between the larger bevel 714 and the surface 860, as will be described below. It will be appreciated that the angles may be closer or farther apart than 20 times in other examples. The angle $\alpha$ may be less than 5°. In one example, the angle $\alpha$ is exactly 1° and the angle $\theta$ is exactly 20°. In one example, the angle of the larger bevel is gradually reduced in an outwardly radial direction toward the smaller bevel. In this way, the larger bevel is angled 20 times more than the smaller bevel at a radial location distal to the smaller bevel, but is angled less than 20 times more (e.g., five times more) at a radial location proximal to the smaller bevel.

The smaller bevel 716 allows an entire surface 712 of the thrust bearing 610 adjacent the surface 860 to be lubricated with oil as the crankshaft 604 rotates. In this way, a direction of centrifugal force (arrow 898) pushes oil through the smaller bevel 716 and into a small space between the surfaces 860 and 712. Although the surfaces 860 and 712 are shown in face-sharing contact in FIG. 8, the surfaces are separated from each other when the crankshaft rotates by oil. Thus, if oil is not located between the surfaces 860 and 712, then the surfaces may rub against one another, increasing a likelihood of degradation (e.g., crankshaft cracking). In this way, the smaller bevel 716 provides sufficient oil between the surface 860 and 712 during crankshaft rotation while also limiting a horizontal movement of the crankshaft parallel to the horizontal axis 795.

Turning now to FIGS. 9A and 9B, they show a side-on view 900 and a face-on view 950, respectively. Side-on view 900 is taken along cutting plane B-B' of FIG. 6. Likewise, face-on view 950 is taken along cutting plane C-C' of FIG. 6.

Side-on view 900 depicts a gap between the surface 860 of the crankshaft 604 and the larger 714 and smaller 716 bevels. As shown, the gap between the surface 860 and the crankshaft 604 is less wide than a gap between the surface 860 and the larger bevel 714. In one example, the gap between the smaller bevel 716 and the surface 860 is 40 µm or less at its greatest distance while the gap between the larger bevel 714 and the surface 860 is 1600 µm or less at its greatest distance. It will be appreciated that the gaps may increase or decrease in size without departing from the scope of the present disclosure.

As shown in FIG. 9B, half of the thrust bearing 610 is shown. The larger bevel 714 is larger than the smaller bevel 716 in length in a radial direction, height, and angle. Specifically, the smaller bevel 716 extends around an entire circumference of the thrust bearing 610, while extending in a radial direction 20-40 µm. However, the larger bevel 714 also extends around the entire circumference of the thrust bearing 610, but while extending in the radial direction by 800-1600 µm. As shown, the larger bevel 714 is radially interior to the smaller bevel 716, and is a larger wedge than the smaller bevel 716.

Turning now to FIG. 10, it shows a method 1000 for determining if the thrust bearing is sufficiently lubricated. Instructions for carrying out method 1000 may be executed by a controller based on instructions stored on a memory of the controller and in conjunction with signals received from sensors of the engine system, such as the sensors described above with reference to FIG. 5. The controller may employ engine actuators of the engine system to adjust engine operation, according to the methods described below.

The method 1000 begins at 1002, where the method determines, estimates, and/or measures current engine operating parameters. Current engine operating parameters may be based on one or more of engine speed, engine load, throttle position, vehicle speed, engine temperature, coolant temperature, and air/fuel ratio.

At 1004, the method 1000 includes determining a thrust bearing lubrication based on feedback from a sensor. The sensor may be a temperature sensor, audio sensor, motion sensor, and/or other type of sensor suitable for monitoring lubrication. For example, if the thrust bearing is insufficiently lubricated, then the temperature sensor may provide a temperature measurement greater than a threshold temperature. Alternatively, if the thrust bearing is insufficiently lubricated, then the audio sensor may measure a sound consistent with metal-on-metal grinding, for example. As such, the sound measured may be louder and sharper than when the thrust bearing is sufficiently lubricated. Further, if the motion sensor is insufficiently lubricated, then the motion sensor may measure a motion of the crankshaft deviated from a threshold motion. For example, the motion may be slower than the threshold motion. Alternatively, the motion may follow a different pattern than the threshold motion (e.g., elliptical instead of circular).

At 1006, the method 1000 determines if the thrust bearing is sufficiently lubricated. If the thrust bearing is sufficiently lubricated (e.g., the thrust bearing is not too hot or audibly distinct from sufficiently lubricated operation), then the method 1000 proceeds to 1008 to maintain current engine operating parameters. However, if the thrust bearing is insufficiently lubricated, then the method 1000 proceeds to 1010 to adjust engine operating parameters to prevent and/or mitigate degradation to the crankshaft and/or thrust bearing. Adjusting engine operating parameters may include decreasing engine rotation speed, decreasing engine power output, and/or other adjustments for decreasing a rotational speed of the crankshaft to decrease friction generated between the crankshaft and the thrust bearing during insufficient lubrication operations.

In this way, an easy-to-manufacture bearing with larger and smaller bevels for providing lubrication between the crankshaft and the thrust bearing may be located between the connecting rod and crankshaft. The bevels traverse an entire circumference of the thrust bearing, with the larger bevel being interior to the smaller bevel. By doing this, the larger bevel directs lubricant to the smaller bevel, which directs lubricant to a gap between the crankshaft and the thrust bearing. The technical effect of using a thrust bearing with two differently sized bevels is to provide sufficient lubrication between the thrust bearing and the crankshaft throughout a thrust load of the crankshaft. By doing this, a likelihood of degradation to the crankshaft is decreased.

A hydrodynamic axial plain bearing for supporting axial forces between bearing parts rotating relative to each other, comprising at least one supporting surface pointing in an axial direction towards one of the bearing parts, wherein viewed in a radial direction, the at least one supporting surface is arranged tilted to the radial direction, wherein the tilt is configured to form a lubrication gap, tapering radially towards the outside, between the supporting surface and the corresponding bearing part, wherein the supporting surface is part of an outer face of a connecting rod. A first example of the bearing further includes where the supporting surface is configured tilted in a circumferential direction, wherein the tilt in the circumferential direction is configured to form a lubrication gap, tapering in the circumferential direction, between the supporting surface and the corresponding bearing part. A second example of the bearing, optionally including the first example, further includes where at least one capture surface being arranged adjacent to the supporting surface in the circumferential direction and/or lying further inward in the radial direction, for forming a lubricant capture gap. A third example of the bearing, optionally including the first and/or second examples, further includes where the supporting surface is part of an outer face of a connecting rod. A fourth example of the bearing, optionally including one or more of the first through third examples, further includes where the supporting surface comprises a tilt angle in the radial direction being less than 5°. A fifth example of the bearing, optionally including one or more of the first through fourth examples, further includes where the lubrication gap extends radially inward less than 50 µm larger than at its narrowest point. A sixth example of the bearing, optionally including one or more of the first through fifth examples, further includes where lubricant grooves open towards the corresponding bearing part. A seventh example of the bearing, optionally including one or more of the first through sixth examples, further includes where the lubricant grooves fluidly connect a radially inner region of a bearing bore of the axial bearing to a radially outer region of the axial bearing.

A system comprising a connecting rod and a crankshaft, and a thrust bearing located between the connecting rod and the crankshaft, the thrust bearing further comprising a larger bevel and a smaller bevel traversing an entire circumference of the thrust bearing, wherein the larger bevel is angled less acutely than the smaller bevel. A first example of the system further includes where the smaller bevel extends in a radial direction less than the larger bevel. A second example of the system, optionally including the first example, further includes where the larger bevel comprises an angle 20 times greater than an angle of the smaller bevel. A third example of the system, optionally including the first and/or second examples, further includes where the smaller bevel corresponds to a gap between the crankshaft and the thrust bearing. A fourth example of the system, optionally including one or more of the first through third examples, further includes where a cross-section of the larger and smaller bevels being parallel to a direction of rotation of the connecting rod and the crankshaft. A fifth example of the system, optionally including one or more of the first through fourth examples, further includes where the smaller bevel forces lubricant between the crankshaft and the thrust bearing.

A system comprising a connecting rod comprising a thrust bearing at an interface between the connecting rod and a crankshaft, and where the thrust bearing is ring-shaped with a larger bevel having a larger angle located radially interior to a smaller bevel with a smaller angle, and where each bevel extends completely around an entire inner circumference of the thrust bearing. A first example of the system further includes where the larger bevel is angled less acutely than the smaller bevel, and where the angle of the larger bevel is equal to 20° and the angle of the smaller bevel is equal to 1°. A second example of the system, optionally including the first example, further includes where the angle of the larger bevel is gradually reduced in an outwardly radial direction toward the smaller bevel. A third example of the system, optionally including the first and/or second examples, further includes where the larger bevel and smaller bevel form respective larger and smaller gaps between the thrust bearing and the crankshaft, and where the gap between the larger bevel and the crankshaft is larger than the gap between the smaller bevel and the crankshaft. A fourth example of the system, optionally including one or more of the first through third examples, further includes where lubrication grooves extending in a radially outward direction along the larger and smaller bevels. A fifth example of the system, optionally including one or more of the first through fourth examples, further includes where the thrust bearing is physically coupled to a bottom of the connecting rod.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A hydrodynamic axial plain bearing for supporting axial forces between bearing parts rotating relative to each other, comprising at least one supporting surface pointing in an axial direction toward one of the bearing parts, wherein viewed in a radial direction, the at least one supporting surface is arranged tilted to the radial direction, wherein the tilt is configured to form a lubrication gap, tapering radially towards the outside, between the supporting surface and the corresponding bearing part, wherein the supporting surface is part of an outer face of a connecting rod, further comprising at least one capture surface being arranged adjacent to the supporting surface in a circumferential direction and with a greater tilt in the radial direction than the supporting surface for forming a lubricant capture gap, and a plurality of lubricating grooves extending in a radially outward direction traversing the at least one capture surface and the supporting surface, and wherein a height of the supporting surface is uniform along a circumference taken between a largest circumference and a smallest circumference of the hydrodynamic axial plain bearing between adjacent lubricating grooves.

2. The hydrodynamic axial plain bearing of claim 1, wherein the capture surface is configured tilted in the circumferential direction, wherein the tilt in the circumferential direction is configured to form the lubricant capture gap, tapering in the circumferential direction, between the capture surface and the corresponding bearing part.

3. The hydrodynamic axial plain bearing of claim 1, wherein the height is measured along a direction perpendicular to a radius of the hydrodynamic axial plain bearing.

4. The hydrodynamic axial plain bearing of claim 1, wherein the supporting surface comprises a tilt angle in the radial direction being less than 5°.

5. The hydrodynamic axial plain bearing of claim 1, wherein the lubrication gap extends radially inward less than 50 μm larger than at its narrowest point.

6. The hydrodynamic axial plain bearing of claim 1, wherein the plurality of lubricating grooves opens toward the corresponding bearing part.

7. The hydrodynamic axial plain bearing of claim 6, wherein the plurality of lubricating grooves fluidly connects a radially inner region of a bearing bore of the hydrodynamic axial plain bearing to a radially outer region of the hydrodynamic axial plain bearing comprising the lubrication gap.

8. A system, comprising:
a connecting rod and a crankshaft; and
a thrust bearing located between the connecting rod and the crankshaft, the thrust bearing further comprising a larger bevel and a smaller bevel traversing an entire circumference of the thrust bearing;
wherein the larger bevel is angled less acutely than the smaller bevel relative to a surface of the crankshaft; and
wherein a plurality of lubricating grooves extending from an innermost circumference to an outermost circumference of the thrust bearing; and wherein heights of the larger bevel and the smaller bevel are uniform along a circumference of the thrust bearing between adjacent lubricating grooves of the plurality of lubricating grooves, and where the circumference is any circumference between the innermost and outermost circumferences.

9. The system of claim 8, wherein the smaller bevel extends in a radial direction less than the larger bevel.

10. The system of claim 8, wherein the larger bevel comprises an angle 20 times greater than an angle of the smaller bevel.

11. The system of claim 8, wherein the smaller bevel corresponds to a gap between the crankshaft and the thrust bearing.

12. The system of claim 8, further comprising a cross-section of the larger and smaller bevels being parallel to a direction of rotation of the connecting rod and the crankshaft.

13. The system of claim 8, wherein the smaller bevel forces lubricant between the crankshaft and the thrust bearing.

14. A system comprising:
a connecting rod comprising a thrust bearing at an interface between the connecting rod and a crankshaft, and where the thrust bearing is ring-shaped with a larger bevel having a larger angle located radially interior to a smaller bevel with a smaller angle relative to a surface of the crankshaft, and a plurality of lubricating grooves extending from an innermost circumference to an outermost circumference of the thrust bearing such that each bevel extends completely around an entire inner circumference of the thrust bearing except at locations of the plurality of lubricating grooves; and where a height of the larger bevel and the smaller bevel is uniform along a circumference of the thrust bearing between adjacent lubricating grooves of the plurality of lubricating grooves, and where the circumference is any circumference between the innermost and outermost circumferences.

15. The system of claim 14, wherein the larger bevel is angled less acutely than the smaller bevel, and where the angle of the larger bevel is equal to 20° and the angle of the smaller bevel is equal to 1°.

16. The system of claim 14, wherein the angle of the larger bevel decreases in an outwardly radial direction toward the smaller bevel.

17. The system of claim 14, wherein the larger bevel and the smaller bevel form respective larger and smaller gaps between the thrust bearing and the crankshaft, and where the gap between the larger bevel and the crankshaft is larger than the gap between the smaller bevel and the crankshaft.

18. The system of claim 14, wherein the thrust bearing is physically coupled to a bottom of the connecting rod.

* * * * *